3,808,186
METHOD FOR PREPARING TRANS-1,4-POLYDIENES

Valentin Pavlovich Shatalov, ulitsa Geroev Stratosfery 1, kv. 4; Viktor Petrovich Judin, pereulok Mendeleeva 7, kv. 71; and Vladimir Viktorovich Krivoshein, ulitsa Geroev Stratosfery 20, kv. 24, all of Voronezh, U.S.S.R.
No Drawing. Filed May 9, 1972, Ser. No. 251,772
Int. Cl. C08d 1/14, 1/20
U.S. Cl. 260—94.3      3 Claims

ABSTRACT OF THE DISCLOSURE

A method for preparing trans - 1,4 - polydienes consisting in that conjugated dienes are polymerized in a medium of a hydrocarbon solvent at a temperature of 0 to 100° C. over a complex catalyst vanadium tetrachloride-titanium tetrachloride-alkyllithium, or polydiene lithium with one or more lithium atoms-alkylaluminum. The molar ratio of vanadium tetrachloride to titanium tetrachloride, organic lithium compound and alkylaluminum is 1:0.01–1:0.01–1:1–5 respectively, while the concentration of vanadium tetrachloride in the reaction mixture is in the range between $1 \times 10^{-3}$ and $15 \times 10^{-3}$ mole/litre.

The proposed method accelerates considerably the rate of polymerization of conjugated dienes and also widens considerably the range of organic lithium compounds used in the complex catalyst for polymerization of the dienes.

---

The invention relates to the methods for preparing polymers of conjugated dienes, and more particularly it relates to the methods for preparing polymers of conjugated dienes having trans-1,4-configuration of the chain links.

The said polymers are used as construction materials, adhesives, and also as additives improving the properties of rubber mixtures and vulcanizates.

A known method for preparing trans - 1,4 - polydienes comprises polymerizing conjugated dienes in a medium of a hydrocarbon solvent at a temperature from 0 to 100° C. over a complex comprising catalyst vanadium tetrachloride-titanium tetrachloride-alkyllithium taken in the molar ratio of the vanadium tetrachloride-to titanium tetrachloride and alkyllithium being 1:0.01–1:1–5 respectively (see U.S. Pat. No. 3,347,839). Polymers containing over 90 percent of the trans - 1,4 - links in the polymer chain and having crystallinity over 20 percent, are obtained in these conditions.

The disadvantage inherent in the known method is the insufficient rate of polymerization (the yield of the polymer is not more than 80 percent during 16 hours).

The object of this invention is to work out a method for preparing trans-1,4-polydienes which will accelerate the process of polymerization of conjugated dienes.

Another object of the invention is to widen the range of organic lithium compounds used in the complex catalyst for polymerization of dienes.

In accordance with these and other purposes, the invention consists in that conjugated dienes are polymerized in a medium of a hydrocarbon solvent at a temperature between 0 and 100° C. over a complex catalyst comprising vanadium tetrachloride titanium-organic lithium compound-alkylaluminum. Alkyllithium or polydienelithium with one or more lithium atoms are used as the organic lithium compound in the catalyst. The molar ratio of the vanadium tetrachloride to titanium tetrachloride, organic lithium compound and alkylaluminum in the complex catalyst is 1:0.01–1:0.01–1:1–5 respectively, while the concentration of vanadium tetrachloride in the reaction mixture is within the range from $1 \times 10^{-3}$ to $15 \times 10^{-3}$ mole/litre.

In the proposed method the described complex catalyst markedly accelerates the process of polymerization of conjugated dienes.

Still greater acceleration of the polymerization process is ensured with a complex catalyst containing a simple ether having an insignificant coordination action, namely diisopropyl ether, diphenyl oxide or anisole, the molar ratio of the ether to the alkylaluminum being 0.5–3:1.

In the proposed method, the range of organic lithium compounds used in the complex catalyst for polymerization of conjugated dienes is substantially enlarged.

The proposed method for preparing trans-1,4-polydienes can be realized as follows.

A hydrocarbon solvent, organic lithium compound, vanadium tetrachloride, titanium tetrachloride, alkylaluminum and a conjugated diene are loaded one after another into a reaction kettle in an atmosphere of a noble gas. A simple ether (diisopropyl ether, diphenyl oxide or anisole) is introduced into the reaction mixture to accelerate the polymerization process before introduction of the conjugated diene.

It is also possible to prepare separately a mixture of components of the catalyst with a 5–10 percent hydrocarbon solvent required for carrying out the polymerization, and a solution of a conjugated diene in the remaining quantity of the hydrocarbon solvent. Then the solution of the conjugated diene is introduced into the said mixture of the components of the complex catalyst in the hydrocarbon solvent. A simple ether can be introduced into the complex catalyst by different methods. It can be either introduced directly into the prepared mixture of the complex catalyst components in the hydrocarbon solvent, or a mixture of the ether with alkyl aluminum can be prepared separately and then introduced into a mixture of vanadium tetrachloride, titanium tetrachloride and organic lithium compound in the hydrocarbon solvent, or else a solution of alkylaluminum in the hydrocarbon solvent can first be prepared, the simple ether added to it, and finally all the remaining components of the complex catalyst introduced.

In the described complex catalyst, the molar ratio of the vanadium tetrachloride to titanium tetrachloride, organic lithium compound and alkylaluminum is 1:0.01–1:0.01–1:1–5 respectively. If polydienelithium having the number of lithium atoms one and more is used as the organic lithium compound, the molar ratio of the polydienelithium to the other components of the complex catalyst should be calculated with reference to the number of gram atoms of lithium present in one litre of the reaction mixture.

Ethyllithium, sec. butyllithium, n-butyllithium, hexyllithium, etc. can be used as the alkyllithium in the complex catalyst.

Polybutadienelithium, isoprene lithium, dilithiumpolyisoprene, dilithiumpolydivinyl, trilithiumpolyisoprene tetralithiumpolydivinyl, etc. can be used in the capacity of polymer compounds of lithium.

The use of an organic lithium compound soluble in a hydrocarbon solvent is preferable.

Compounds having any alkyl radical, for example trimethylaluminum, triethylaluminum, etc., can be used as alkylaluminum in the complex catalyst. However, triisobutylaluminum is preferred.

A suitable hydrocarbon solvent is an aliphatic hydrocarbon, for example isopentane, heptane, hexane; or an alycyclic hydrocarbon, for example cyclohexane, methylcyclohexane, ethylcyclohexane, tetraline; or an aromatic hydrocarbon, for example, toluene, benzene. Furthermore, a natural mixture of hydrocarbons, for example, benzine, or else an artificially prepared mixture of hydrocarbons, for example, a mixture of toluene and benzene, cyclohexane and hexane, can also be used as the solvent.

The polymerization process is carried out at a temperature from 0 to 100° C. with stirring of the reaction mixture. The heat of the reaction is removed by cooling the reaction kettle. Depending on the type of the hydrocarbon solvent used, the polymerization reaction can proceed either in a homogeneous phase (if the formed polymer is dissolved in the solvent), or in a heterogeneous phase (if the formed polymer is precipitated from the solution). The isolation of the polymer from solution can be done by any known method, for example by precipitating with ethyl alcohol with subsequent separation from the solution and drying.

For a better understanding of the invention, the following examples are given by way of illustration.

EXAMPLE 1

The following components were loaded into the reaction kettle one after another: 83 parts by weight of toluene, sec. butyllithium, vanadium tetrachloride, titanium tetrachloride and triisobutyl aluminum taken in the molar ratio of 0.01:1:0.05:2 respectively, and 9 parts by weight of isoprene. The concentration of vanadium tetrachloride in the reaction mixture was $5 \times 10^{-3}$ mole/liter. Isoprene was polymerized at a temperature of 20° C. In 2.5 hours the yield of the polymer was 60 percent. The polyisoprene contained 98.3 percent of the trans - 1,4 - links and had the molecular weight of 945,000. After pressing at a temperature of 100° C., the tensile strength of the polymer was 284 kg./sq. cm. The Shore hardness was 94 percent.

EXAMPLE 2

The following components were loaded into the reaction kettle: 87 parts by weight of toluene, titanium tetrachloride, vanadium tetrachloride and sec. butyllithium. The mixture was stirred for 20 minutes, and triisobutylaluminum was then added. The molar ratio of titanium tetrachloride, to vanadium tetrachloride, sec. butyllithium and triisobutylaluminum was 0.2:1:1:2 respectively. Then, ten parts by weight of isoprene were added. The concentration of vanadium tetrachloride in the reaction mixture was $15 \times 10^{-3}$ mole/liter. In 90 minutes the yield of the polymer was 15.8 percent. The polyisoprene contained 90.5 percent of the trans-1,4-links and had the molecular weight of 1,222,000.

EXAMPLE 3

The following components were loaded into the reaction kettle one after another: 88 parts by weight of toluene, trilithiumpolyisoprene, vanadium tetrachloride, titanium tetrachloride and triisobutylaluminum, taken in the molar ratio of 0.01:1:0.05:2 respectively, and 5.5 parts by weight of butadiene-1,3. The concentration of vanadium tetrachloride in the reaction mixture was $5 \times 10^{-3}$ mole/liter. The polymerization of butadiene-1,3 was carried at a temperature of 20° C. In three hours the yield of the polymer was 54.5 percent. It contained 90.5 percent of the trans-1,4-links. After pressing at a temperature of 180° C. the tensile strength of the polymer was 285 kg./sq. cm.

EXAMPLE 4

The following components were loaded into the reaction kettle one after another: 92 parts by weight of cyclohexane, dilithiumpolyisoprene, vanadium tetrachloride, titanium tetrachloride and triisobutylaluminum taken in the molar ratio of 0.05:1:0.05:2, respectively, and also 8 parts by weight of isoprene. The concentration of vanadium tetrachloride in the reaction mixture was $3 \times 10^{-3}$ mole/liter. The polymerization of isoprene was carried out at a temperature of 25° C. In four hours the yield of the polymer was 45 percent. It contained 96 percent of the trans-1,4 links and had the molecular weight of 1,000,000. After pressing at a temperature of 100° C., the tensile strength of the polymer was 350 kg./sq. cm., the Shore hardness was 95 percent and the degree of crystallinity was 53 percent.

EXAMPLE 5

The following components were charged into the reaction kettle one after another: 86.5 parts by weight of toluene, lithiumpolyisoprene, triisobutylaluminum and diisopropyl ether. The mixture was mixed for 60 minutes and titanium tetrachloride, vanadium tetrachloride and 9.7 parts by weight of isoprene were added. The molar ratio of lithiumpolyisoprene to aluminum triisobutylaluminum, diisopropyl ether, titanium tetrachloride and vanadium tetrachloride was 0.01:2:2:0:0.05:1, respectively. The concentration of vanadium tetrachloride in the reaction mixture was $5 \times 10^{-3}$ mole/liter. The polymerization of isoprene was carried out at a temperature of 20° C. In one hour the yield of the polymer was 42.5 percent. It contained 97.5 percent of the trans-1,4 links and had the molecular weight of 803,000.

EXAMPLE 6

Into the reaction kettle were loaded 57 parts by weight of isopentane and 5 parts by weight of isoprene. A suspension of a complex catalyst in isopentane was prepared separately. To this end, three parts by weight of isopentane were mixed with dilithiumpolyisoprene, vanadium tetrachloride, titanium tetrachloride and triisobutylaluminum taken in the molar ratio of 0.01:1:0.05:2, respectively. The prepared mixture was loaded into the reaction kettle. The concentration of vanadium tetrachloride in the reaction mixture was $5 \times 10^{-3}$ mole/liter. The polymerization of isoprene was carried out at a temperature of 20° C. The yield of polyisoprene in seven hours was 47 percent. The polymer contained 98.8 percent of the trans-1,4 links and had the molecular weight of 625,000. After pressing at a temperature of 100° C. the tensile strength of the polymer was 330 kg./sq. cm., and the Shore hardness was 93 percent.

EXAMPLE 7

The following components were loaded into the reaction kettle one after another: 83 parts by weight of toluene, dilithiumisoprene, vanadium tetrachloride, titanium tetrachloride and triisobutylaluminum, taken in the molar ratio of 0.01:1:1:5, respectively, and 9 parts by weight of isoprene. The concentration of vanadium tetrachloride in the reaction mixture was $1 \times 10^{-3}$ mole/litre. The polymerization of isoprene was carried out at a temperature of 20° C. The yield of polyisoprene in 3.5 hours was 10 percent. The polymer contained 89.2 percent of the trans-1,4 links and had the molecular weight of 2,450,000.

EXAMPLE 8

The following components were loaded into the reaction kettle at a temperature of 5° C.: 83 parts by weight of toluene, sec. butyllithium, titanium tetrachloride, vanadium tetrachloride and triisobutylaluminum taken in the molar ratio of 0.01:0.05:1:3.2, respectively, and 9 parts by weight of isoprene. The concentration of vanadium tetrachloride in the reaction mixture was $3 \times 10^{-3}$ mole/litre. The polymerization of isoprene was carried out at a temperature of 0° C. The yield of the polymer in 2.5 hours was 15 percent. The polyisoprene contained 92.4 percent of the trans-1,4 links and had the molecular weight of 870,000.

EXAMPLE 9

The following components were loaded into the reaction kettle one after another at a temperature of 20° C.: 75 parts by weight of cyclohexane, dilithiumpolydivinyl, vanadium tetrachloride, titanium tetrachloride and triisobutylaluminum, taken in the molar ratio of 0.07:1:0:0.05:2 respectively, and 9 parts by weight of isoprene. The concentration of vanadium tetrachloride in the reaction mixture was $2 \times 10^{-3}$ mole/litre. The polymerization of isoprene was carried out at a temperature of 100° C. The yield of the polymer in two hours was 17 percent. The polyisoprene contained 91 percent of the trans-1,4 links and had the molecular weight of 1,010,000.

EXAMPLE 10

The following components were loaded into the reaction kettle one after another: 54 parts by weight of a mixture consisting of 80 percent of cyclohexane and 20 percent of benzine, dilithiumpolydivinyl, vanadium tetrachloride, titanium tetrachloride and triisobutylaluminum, taken in the molar ratio of 0.01:1:0:0.5:1:16 respectivly, and 7 parts by weight of isoprene. The concentration of vanadium tetrachloride in the reaction mixture was $4.7 \times 10^{-3}$ mole/litre. The polymerization of isoprene was carried out at a temperature of 20° C. The yield of the polymer in four hours was 29.5 percent. The polyisoprene contained 90.6 percent of the trans-1,4 links and had the molecular weight of 1,600,000.

EXAMPLE 11

Into the reaction kettle were loaded 93 parts by weight of toluene, triethylaluminum and diphenyloxide. The obtained solution was mixed for 35 minutes at a temperature of 20° C., after which n-butyllithium, vanadium tetrachloride and titanium tetrachloride were added. The molar ratio of triethylaluminum to diphenyl oxide, n-butyllithium vanadium tetrachloride and titanium tetrachloride was 2:6:0.1:1:0.05 respectively. Then, 7 parts by weight of isoprene were added into the reaction kettle. The concentration of vanadium tetrachloride in the reaction mixture was $2 \times 10^{-3}$ mole/litre. The polymerization of isoprene was carried out at a temperature of 50° C. The yield of the polymer in one hour was 75 percent. The polyisoprene contained 95.4 percent of the trans-1,4 links and had the molecular weight of 1,600,000.

EXAMPLE 12

Into the reaction kettle were loaded 94 parts by weight of toluene, triethylaluminum, anisole and sec. butyllithium. The solution was mixed for 40 minutes, and vanadiumtetrachloride and titanium tetrachloride were then added to the solution. The molar ratio of triethylaluminum to anisole, sec. butyllithium, vanadium tetrachloride and titanium tetrachloride was 2:1:0.01:1:0.05 respectively. Then 6 parts by weight of isoprene were added. The concentration of vanadium tetrachloride in the reaction mixture was $1 \times 10^{-3}$ mole/liter. The polymerization was carried out at a temperature of 20° C. The yield of the polymer in one hour was 80 percent. The polyisoprene contained 90 percent of the trans-1,4 links and had the molecular weight of 1,000,000.

The present invention can be realized also with a complex catalyst containing diisopropyl ether, diphenyl oxide or anisole, the molar ratio of the ether to alkylaluminum being 0.5–3:1.

We claim:

1. A method for preparing trans-1,4-polydienes, comprising polymerizing conjugated dienes in a hydrocarbon solvent medium at a temperature of 0 to 100° C. over a complex catalyst comprising vanadium tetrachloride-titanium tetrachloride-alkylaluminum, an organic lithium compound selected from the group consisting of alkyllithium, polydienelithium with one lithium atom and polydienelithium with more than one lithium atom, the molar ratio of vanadium tetrachloride to titanium tetrachloride, alkylaluminum and an organic lithium compound being 1:0.01–1:1–5:0.01–1 respectively, and the concentration of vanadium tetrachloride in the reaction mixture being between $1 \times 10^{-3}$ and $15 \times 10^{-3}$ mole/liter.

2. A method according to claim 1, wherein said complex catalyst further comprises an ether, the molar ratio of the ether to alkylaluminum being 0.5–3:1.

3. A method according to claim 2, wherein said ether is selected from the group consisting of diisopropyl ether, diphenyl oxide, and anisole.

References Cited
UNITED STATES PATENTS

| | | | |
|---|---|---|---|
| 3,347,839 | 10/1967 | Lasis | 260—94.3 |
| 3,404,141 | 10/1968 | Owen | 260—94.3 |
| 3,502,636 | 3/1970 | Witte et al. | 260—94.3 |
| 3,550,158 | 12/1970 | Natta et al. | 260—94.3 |
| 3,580,899 | 5/1971 | Massoubre | 260—94.3 |
| 3,657,209 | 4/1972 | Carlson et al. | 260—94.3 |

JOSEPH L. SCHOFER, Primary Examiner

W. F. HAMROCK, Assistant Examiner